United States Patent [19]

Rekoff, Jr.

[11] 4,041,795

[45] Aug. 16, 1977

[54] MECHANISM FOR CONVERTING ROTARY MOTION INTO PRECISE LOW SPEED LINEAR MOTION

[75] Inventor: Michael George Rekoff, Jr., Huntsville, Ala.

[73] Assignee: Teledyne Brown Engineering, Huntsville, Ala.

[21] Appl. No.: 653,572

[22] Filed: Jan. 29, 1976

[51] Int. Cl.² .................................... F16H 1/18
[52] U.S. Cl. ...................................... 74/424.8 B
[58] Field of Search .............................. 74/424.8 B

[56] References Cited

U.S. PATENT DOCUMENTS

| 459,769 | 9/1891 | Russell | 74/424.8 B |
| 2,338,271 | 1/1944 | Ulanet | 74/424.8 B |
| 2,859,657 | 6/1958 | Harker | 74/424.8 B |
| 2,860,266 | 11/1958 | Schrader | 74/424.8 B |
| 3,213,702 | 10/1965 | Deehan et al. | 74/424.8 B |

Primary Examiner—Samuel Scott
Assistant Examiner—Wesley S. Ratliff, Jr.
Attorney, Agent, or Firm—Beveridge, DeGrandi, Kline & Lunsford

[57] ABSTRACT

This invention relates to a device for producing precise linear movement in response to a rotary input. More particularily, the invention comprises two threaded shafts respectively having threads of different pitches, one of the shafts being secured against both axial and rotation movements and the other shaft being connected to an actuated device in such fashion that only axial movements of the other shaft is permitted, and cylindrical member rotated by a power source connected by separate threaded sections to both said threaded shafts, whereby rotation of the cylindrical member results in a low speed movement of the actuated member at a rate proportional to the difference in the reciprocals of the thread pitches.

2 Claims, 3 Drawing Figures

MECHANISM FOR CONVERTING ROTARY MOTION INTO PRECISE LOW SPEED LINEAR MOTION

BACKGROUND OF THE INVENTION

In numerous applications, namely the machine tool, aeronautics and space industries, there is need for mechanisms for converting a high speed rotary motion, generally derived from an electric motor, into a relatively low speed, precise linear motion for the actuation of a control element. For example, when an internally threaded nut member is rotated by an electric motor at a conventional speed of 1800 rpm, then even with a thread pitch as fine as a 100 threads to the inch, a threaded shaft co-operating with the nut member will be nearly advanced by one inch for each 100 revolutions of the motor shaft. It would be highly desirable if the linear advancement of a shaft in response to a rotational input could be on the order of 1/100th or less that derived by utilizing a screw and nut arrangement. At the same time, the resulting mechanism should remain relatively simple and economical to manufacture by conventional machining techniques.

OBJECTS OF THE INVENTION

It is, accordingly, an object of the invention to provide an improved mechanism for converting rotary motion into relatively slow speed, precise linear motion. A further object of the invention is to provide a mechanism for converting rotary motion derived from a motor to precise, slow speed linear motion through the co-operation of two (2) conventionally threaded shaft members with a cylindrical intermediate member having separate threaded portions engageable with the two (2) threaded shaft members so that the resulting linear motion of one of the threaded shaft members is a function of the difference in the reciprocals of the thread pitches of the two threaded shaft elements.

Other objects and advantages of the invention will become apparent to those skilled in the art from the following detailed description, taken in conjunction with the annexed sheets of drawings.

DESCRIPTION OF INVENTION

Figure 1:
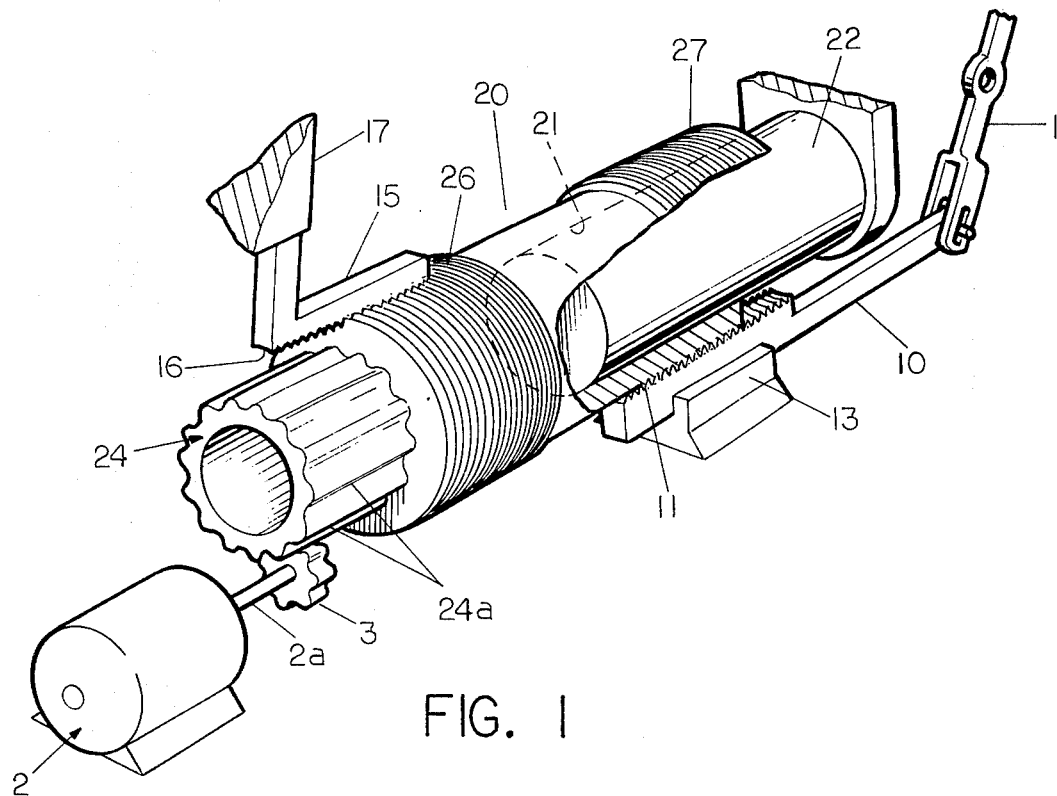
FIG. 1 is a perspective view of a mechanism schematically illustrating the basic principles of this invention.

Referring to FIG. 1, numeral 1 represents a control link which is desired to be precisely actuated by linear motion applied thereto by a first rod-like member 10. The motion source is represented as a conventional electric motor 2 having an output shaft 2a and a drive pinion 3 mounted on such shaft. Let it be assumed that the preciseness of actuation of control member 1 requires a linear motion of rod member 10 less than one thousandth of an inch for each rotation of motor shaft 2a.

Such precise actuation may be provided through the utilization of a cylindrical member 20 having a hollow bore 21 in one end thereof by which the member 20 is rotatably and axially slidably mounted on a fixed cantilevered shaft 22. The other end of cylindrical member 20 is provided with an axially elongated gear portion 24 having teeth 24a meshable with motor driven pinion 3 in all axial positions of the cylindrical member 20 normally encountered in the operation of the mechanism.

Lastly, a second rod-like member 15 is provided having a threaded segment 16 formed thereon. Rod 15 is secured against both axial and rotational movements by a mounting block 17. The threaded portion 16 co-operates with threads 26 provided on the adjacent end of the cylindrical member 20. Similarly, the rod-like member 10 is provided with a threaded portion 11 which cooperates with threads 27 provided on the other end of the cylindrical member 20. Rod-like member 10 is supported for slidable, but non-rotatable movement by a U-shaped guide support 13.

According to this invention, the pitch of the threads 27 interconnecting cylindrical member 20 with the actuating rod 10 is slightly different than the pitch of the threads 26 connecting the cylindrical member 20 with the stationary threaded rod 15. Hence, for each rotation of the cylindrical member 20 produced by the interengagement of the motor-driven pinion 3 with the axially extending gear portion 24, the cylindrical member 20 will be moved either to the right or left, depending upon the direction of rotation of motor 2, by an amount which is a function of the reciprocal of the pitch of the threads 26. At the same time, the control rod 10 will be moved axially in the opposite direction relative to the cylindrical member 20 by an amount proportional to the reciprocal of the pitch of the threads 27. Hence, it follows that the net movement of the control rod 10 is proportional to the difference in the reciprocals of the two threaded portions 26 and 27 provided on the cylindrical member 20. The result is that ordinary threads of commonly utilized pitches will produce a very precise linear motion of the control rod 10 in response to a relatively large number of rotations of the motor shaft 2.

For example, assume that the gear reduction ratio between the motor-driven pinion 3 and the cylindrical member 20 is one to ten. Then in one rotation of the motor 2, the cylindrical member will be rotated by only 36°. If the pitch of the threads 26 are say 36 threads per inch while the pitch of the threads 27 are 40 threads per inch the resultant linear movement of the control rod 10 in response to a full revolution of movement of cylindrical member 20 would be the difference of the reciprocals of the two thread pitches or 0.00278 inches per drum revolution. For one revolution of the motor shaft, the linear distance traveled by the control rod 10 is one tenth of that figure or 0.000278 inches. It is therefore apparent that highly precise linear movement of the control shaft 10 may be produced in response to relatively high speed rotation of the motor 2.

Figure 2:
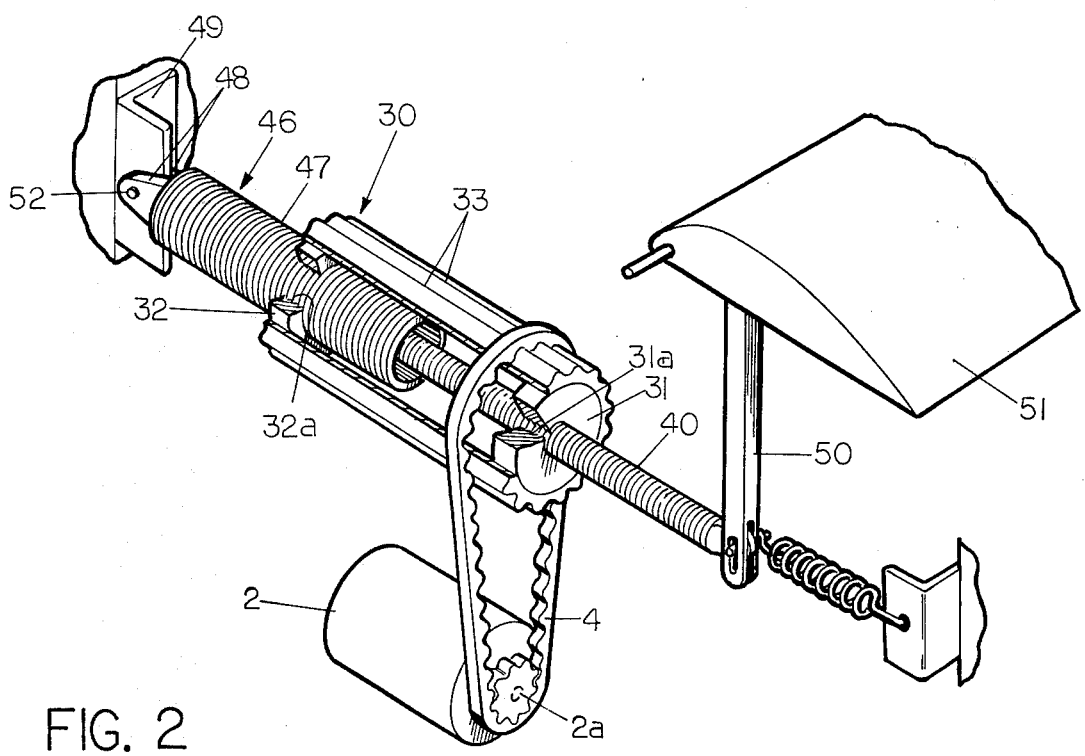
FIG. 2 is a perspective view schematically illustrating a preferred embodiment of this invention.

Referring now to FIG. 2, there is shown a preferred embodiment of this invention in that the various elements of the mechanism are concentrically arranged so as to provide a very compact structure and particularly one that requires no special mountings for the axial movements of the cylindrical member and the threaded output rod member.

In this embodiment, the cylindrical member 30 is of hollow drum-like configuration and has annular discs 31 and 32 pressed fitted in each axial end of the drum. The threaded output shaft 40 is illustrated as being connected to an actuating link 50 for a wing-flap 51 or aerfoil for an aircraft. The control shaft 40 is threadably engaged with internal threads 31a provided in the end disc 31.

The second threaded shaft comprises a hollow member 46 of greater internal diameter than output shaft 40 and is provided with external threads 47 which co-operate with similar internal threads 32a in the drum disc 32. As in the previous modification, there is a slight difference in the pitch of the threads 31a and 32a. The second threaded shaft 45 is secured against both axial and rotational movements by a pair of integral ears 48 which are secured to a stationary bracket 49 by a pin 52.

To impart continuous rotational movement to the drum 30 irrespective of its axial position, the motor 2 is connected to the drum 30 by an internally toothed flexible belt 4 which traverses the motor-driven pinion 3 and engages axially extending teeth 33 provided along the entire periphery of the drum 30.

As in the previous example, the resultant linear motion of the control shaft 40 is a function of the difference in pitch of the threaded sections 31a and 32a and hence, a very precise linear axial movement of the control shaft 40 results from a relatively high speed rotation of the motor shaft 2a.

A number of alternative means may be employed to effect the rotation of the cylindrical member 20 of FIG. 1 or the cylindrical drum 30 of FIG. 2. For example, referring to FIG. 3, the central portion of the member 20 of FIG. 1 may be constructed as a squirrel cage rotor 60 of an induction motor and a stator 61, including conventional field coils, is provided in surrounding relationship to the squirrel cage rotor portion 60. In this manner, the necessary rotational movement is imparted to the cylindrical member 20 irrespective of its axial position by energization of stator 61. Obviously, either the rotor portion 60 should be of greater axial extent than the stator 61, or vice versa, to accommodate the required amount of axial shifting of the cylinder 20 that is encountered in the normal operation of the motion translating mechanism.

Figure 3:
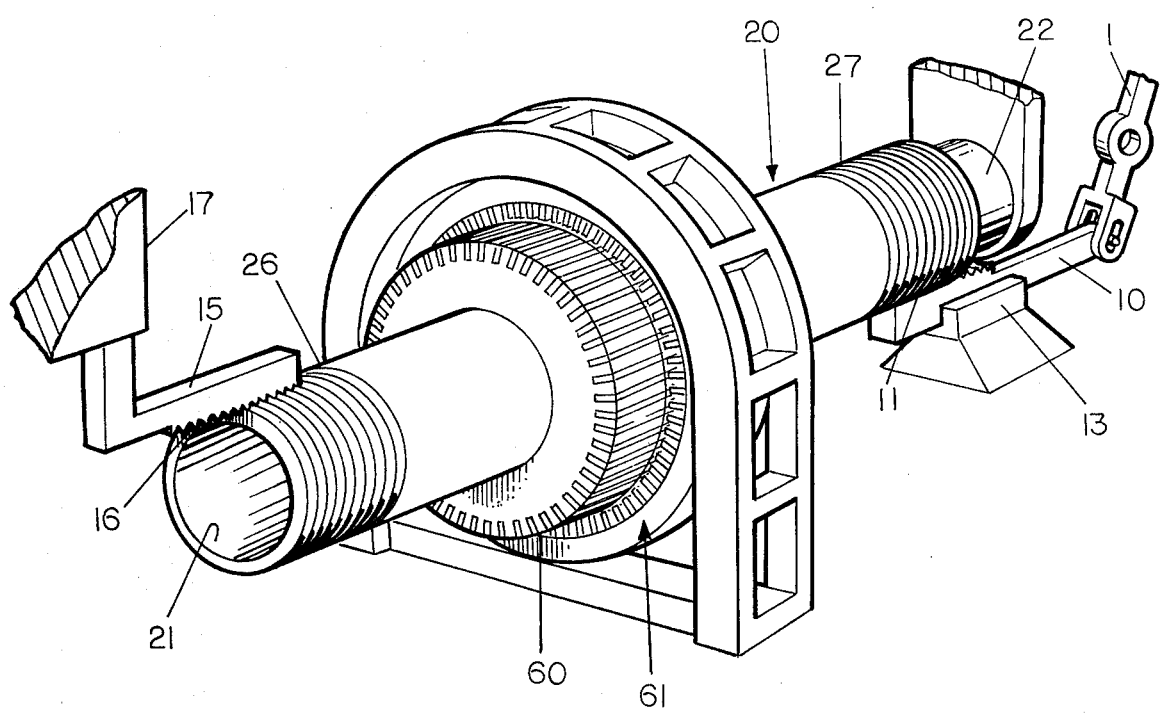
FIG. 3 is a partial perspective view illustrating a modification of FIG. 1.

FIG. 3 represents merely one of a number of prime movers which could form an integral part of the intermediate cylinder 20 or drum 30. The medial portion of cylinder 20 or drum 30 could form the armature of a d.c. motor or the rotor of an hydraulic motor. The only requirement is that it be capable of limited axial movement as well as the required rotational movement.

Further modifications of this invention will be apparent to those skilled in the art and it is intended that the scope of this invention be determined by the appended claims.

I claim:

1. Mechanism for converting continuous rotary motion into a relatively slow speed rectilinear motion comprising:
   1. a thread carrying output rod fixed against rotation but free to shift in an axial direction;
   2. a second thread carrying rod fixed against both axial and rotational movements and positioned with its axis parallel to the axis of said first thread carrying rod, one of said rods being hollow and dimensioned to freely surround said other rod;
   3. a hollow cylindrical member supported by said first and second thread carrying rods, said cylindrical member defining a first internal thread means co-operating with the threads on said first thread carrying rod and a axially spaced second internal thread means co-operating with the threads on second threaded rod, and
   4. means for continuously rotating said cylindrical member in either direction, whereby said output rod is axially shifted as a function of the difference of the thread pitches of said output rod and said second rod.

2. The mechanism of claim 1 wherein a medial portion of said cylindrical member is constructed and arranged to comprise the rotor portion of a rotary prime mover, and a prime mover stator means co-operating with said medial portion in all axial positions of said hollow cylindrical member to continuously rotate said hollow cylindrical member in either direction.

* * * * *